June 28, 1932.  M. P. YOUKER  1,864,879
RETURN BEND ASSEMBLY
Filed Oct. 30, 1931

Inventor
M. P. Youker
By Robt. E. Barry
Attorney

Patented June 28, 1932

1,864,879

UNITED STATES PATENT OFFICE

MALCOLM P. YOUKER, OF BARTLESVILLE, OKLAHOMA

RETURN BEND ASSEMBLY

Application filed October 30, 1931. Serial No. 572,157.

This invention relates to improvements in a return bend assembly to be used for connecting tubes in a tubular oil heater or the like.

One of the objects of the invention is to provide a return bend assembly which may be readily dismantled or assembled for cleaning, replacement or repair of either the elbow itself or the tubes which are joined by said elbow.

Another object is to furnish a return bend which may be used under high pressure with a maximum degree of safety and a minimum possibility of leakage.

With the foregoing objects outlined and with other objects in view which will appear as the description proceeds, the invention consists in the novel features hereinafter described in detail, illustrated in the accompanying drawing, and more particularly pointed out in the appended claims.

Figure 1:
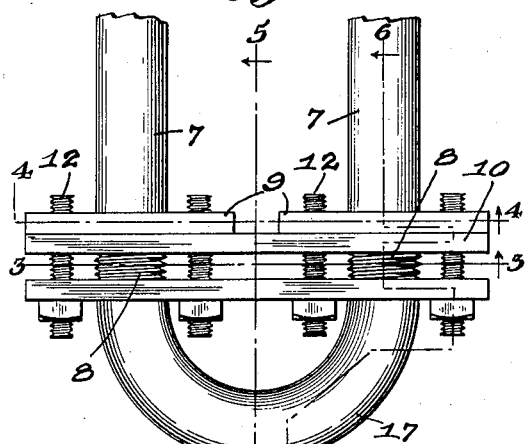
Fig. 1 is a plan view of the entire return bend assembly connected to the extremities of two tubes.
Figure 3:
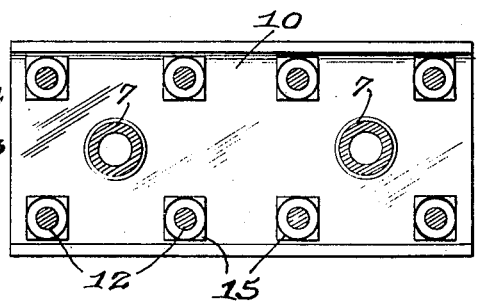
Figure 2:
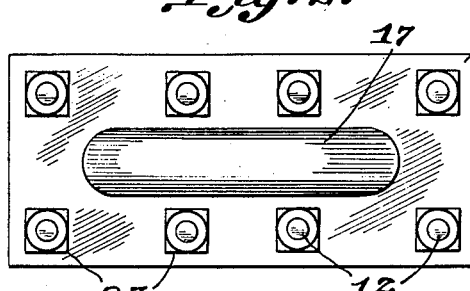
Fig. 2 is an end elevation of the same.
Figure 4:
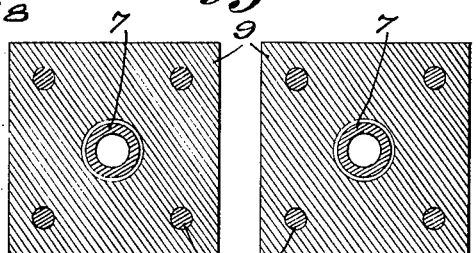
Figure 5:
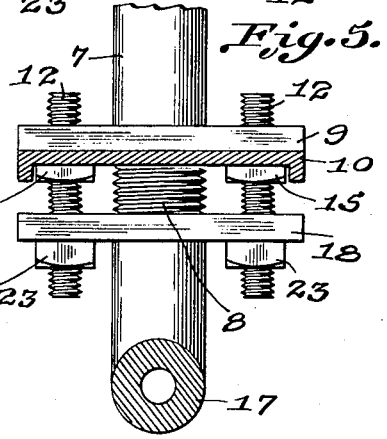
Figure 6:
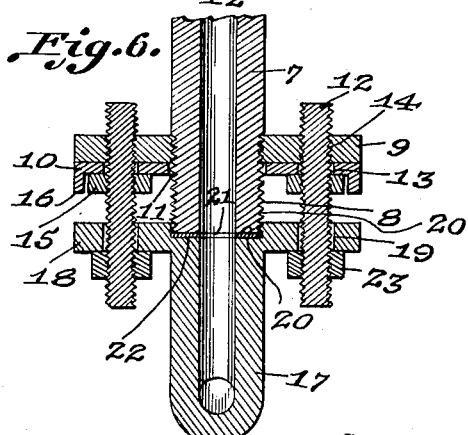

Figs. 3, 4, 5 and 6 are sectional views respectively, taken on the lines 3—3, 4—4, 5—5 and 6—6 of Fig. 1.

Referring to the drawing, 7 designates a pair of tubes such as are employed in tubular oil heaters. In accordance with the present invention, each end of such a tube is externally threaded as shown at 8 for some distance from its extremity, and on this threaded portion, a flange 9 is arranged. The flange has internal threads so that it may be screwed up on the tube to such an extent that the threaded extremity of the tube will project through the flange.

After the flanges 9 have been placed on the tubes, a connecting link or plate 10 is placed over the ends of the tubes and against the flanges, and it will be noted that the link has apertures 11 of slightly larger diameter than the threaded portions of the tubes, so that the link will readily slip over the ends of the tubes.

Stud bolts 12 are passed through unthreaded apertures 13 in the link and screwed into threaded apertures 14 of the flanges. Nuts 15 on the bolts function to secure the link in tight engagement with the flanges, and the link is preferably provided with edge flanges 16 which act as locks to prevent the nuts from loosening.

The return bend consists of a U-shaped pipe 17 having its ends integral with an apertured plate 18 of about the same dimensions as the link, and when the return bend is placed in position, the bolts are threaded through the apertures 19 of the plate, until the machined extremities 20 of the tubes come into engagement with gaskets 21 arranged in machined recesses 22 which are positioned within the plate and are of about the same diameter as the external diameter of the tubes 7.

Outside nuts 23 are employed on the nuts to force the plate and the return bend toward the tubes.

While the invention has been described in connection with tubular oil heaters, it will be obvious that it may be employed in any environment where it is desired to use a U-shaped coupling for connecting the adjacent ends of a pair of pipes.

From the foregoing it is believed that the construction, operation and advantages of the invention may be readily understood by those skilled in the art, and it is manifest that changes may be made in the details disclosed, without departing from the spirit of the invention, as expressed in the claims.

What I claim and desire to secure by Letters Patent is:

1. A return bend assembly including a plurality of tubes, flanges detachably connected to the ends of the tubes, a link joining the ends of said tubes, the pipe ends projecting through said flanges and link, a return bend having plate portions at its ends, the extremities of the tubes projecting into said plate portions, and means for drawing said plate portions toward said flanges, the last mentioned means comprising bolts extending through the flanges and plate portions.

2. A return bend assembly including a plurality of tubes, flanges detachably connected to the ends of the tubes, a link joining the ends of said tubes, the pipe ends projecting through said flanges and link, a return bend having plate portions at its ends, the extremities of the tubes projecting into said plate portions, means for drawing said plate portions toward said flanges, the last mentioned means comprising threaded bolts extending through the flanges, link and plate portions, and nuts on the bolts for clamping the link to the flanges.

3. A return bend assembly including a plurality of tubes, flanges detachably connected to the ends of the tubes, a link joining the ends of said tubes, the pipe ends projecting through said flanges and link, a return bend having plate portions at its ends, the extremities of the tubes projecting into said plate portions, means for drawing said plate portions toward said flanges, the last mentioned means comprising threaded bolts extending through the flanges, link and plate portions, and nuts on the bolts for clamping the link to the flanges, the link being shaped to prevent the nuts from accidentally loosening.

4. A return bend assembly comprising a plurality of tubes having threaded extremities, a plurality of flanges threaded on to the extremities of the tubes, a link joining the tubes, the threaded extremities of the tubes projecting through the flanges and link, a return bend pipe, a plate rigidly united with the ends of the pipe and having recesses to receive the extremities of the tubes, and bolts and nuts for drawing said plate toward said flange.

In testimony whereof, I hereto affix my signature.

MALCOLM P. YOUKER.